US008838650B2

(12) United States Patent
Fei et al.

(10) Patent No.: US 8,838,650 B2
(45) Date of Patent: Sep. 16, 2014

(54) METHOD AND APPARATUS FOR PREPROCESSING A PLURALITY OF DOCUMENTS FOR SEARCH AND FOR PRESENTING SEARCH RESULT

(75) Inventors: Ben Fei, Beijing (CN); Zhong Su, Beijing (CN); Qing Bo Wang, Beijing (CN); Li Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 11/847,285

(22) Filed: Aug. 29, 2007

(65) Prior Publication Data

US 2008/0086457 A1    Apr. 10, 2008

(30) Foreign Application Priority Data

Aug. 29, 2006    (CN) .......................... 2006 1 0126579

(51) Int. Cl.
*G06F 7/00* (2006.01)
(52) U.S. Cl.
USPC ........................................ 707/797; 707/803
(58) Field of Classification Search
USPC .................................. 707/797, 803
See application file for complete search history.

(56) References Cited

U.S. PATENT DOCUMENTS

| | | | | |
|---|---|---|---|---|
| 5,418,946 | A * | 5/1995 | Mori ..................................... | 1/1 |
| 5,694,594 | A * | 12/1997 | Chang .................................. | 1/1 |
| 5,708,806 | A * | 1/1998 | DeRose et al. ....................... | 1/1 |
| 5,838,323 | A | 11/1998 | Rose et al. ................... | 345/349 |
| 5,963,205 | A * | 10/1999 | Sotomayor .................. | 715/236 |
| 5,991,713 | A * | 11/1999 | Unger et al. ...................... | 704/9 |
| 6,026,417 | A * | 2/2000 | Ross et al. .................... | 715/210 |
| 6,230,173 | B1 * | 5/2001 | Ferrel et al. .................. | 715/205 |
| 6,853,992 | B2 * | 2/2005 | Igata ............................ | 707/741 |
| 2001/0007987 | A1 * | 7/2001 | Igata ................................ | 707/3 |
| 2003/0177443 | A1 * | 9/2003 | Schnelle et al. ............. | 715/513 |
| 2004/0133557 | A1 * | 7/2004 | Wen et al. ......................... | 707/3 |
| 2005/0278293 | A1 * | 12/2005 | Imaichi et al. ................... | 707/1 |
| 2006/0155690 | A1 | 7/2006 | Wen et al. ......................... | 707/3 |
| 2006/0195431 | A1 * | 8/2006 | Holzgrafe et al. ............... | 707/3 |

FOREIGN PATENT DOCUMENTS

| | | | | |
|---|---|---|---|---|
| CN | 1622079 A | 6/2005 | ............. | G06F 17/00 |
| CN | 1581172 A | 9/2005 | ............. | G06F 17/30 |
| KR | 20010069785 | * 7/2001 | ............. | G06F 17/30 |

OTHER PUBLICATIONS

Automatically Summarizing Web Sites—Is There a Way Around It?, Einat Amitay et al., AMC 2000, pp. 173-179.
Improving Display of Search Results in Information Retrieval Systems—User's Study, Offer Drori, Hebrew University of Jerusalmen/SHAAM—Information Systems, pp. 1-12 2001.
Improving Searching in Large Document Collections Using Automatic Table-of-Contents Interface, Wu et al., Information Systems Department, New Jersey Institute of Technology, pp. 1-3 No Date Available.

* cited by examiner

*Primary Examiner* — Tony Mahmoudi
*Assistant Examiner* — Michael Le
(74) *Attorney, Agent, or Firm* — Ido Tuchman; William J. Stock (57) ABSTRACT

A method and apparatus for preprocessing a plurality of documents for search and presenting search result and a system for searching documents that comprises these apparatuses. The search result, for example, includes at least one candidate document. The candidate document is assigned a tree structure representing its content. The tree structure includes at least one node. The method may include presenting at least a portion of the tree structure corresponded to the candidate document in the search result.

21 Claims, 10 Drawing Sheets

| 3 | *features and requirements* | | 8 |
|---|---|---|---|
| | 3.1 | *knowledge center* | 8 |
| | | 3.1.1  knowledge map | 8 |
| | | 3.1.2  document management | 9 |
| | | 3.1.3  content management | 11 |
| | | 3.1.4  content search | 12 |
| | | 3.1.5  information subscription | 13 |
| | | 3.1.6  personal knowledge agent | 13 |
| | | 3.1.7  knowledge flow management | 13 |
| | | 3.1.8  knowledge security management | 13 |
| | 3.2 | *e-learning* | 14 |
| | | 3.2.1  study management | 15 |
| | | 3.2.2  course management | 15 |
| | | 3.2.3  network exam and online exercise | 15 |
| | | 3.2.4  online communication | 15 |
| | | 3.2.5  virtual staff room | 15 |
| | | 3.2.6  assess and evaluate architecture | 16 |
| | | 3.2.7  employee professional developping plan | 16 |
| | | 3.2.8  interfacing with HR system | 16 |

| Better backbone You will benefit from a major software upgrade, which searches more information sources (including dogear, IBM's social bookmarking environment). The details: Search more sources, including forums, blogs, wikis and ibm.com. Simply put, if a search engine searches more pages, then it's more likely to find what you're looking for. Such extended searches are possible thanks to substantial upgrade to OminFind 8.3 (Software Group's latest Enterprise Search tool -- available to customers). Don't worry about which search tab has the best answer. A new sidebar on the right of the results page gives a preview of the results of your search on each of the other search tabs (Bluepages; News; and Forums, blogs, and wikis) -- don't forget to scroll down. Easier to use 'advance search' Advanced search techniques have long been available, but are infrequently used. Advanced search features can now be accessed directly below the "Go" button. | Ask me about managing an enterprise-wide solution like w3 search. Ask me about the technology behind w3 search. Related links Tips to improve your search results [IBM Standard Solution Finder (ISSF)] Learn about and participate in other Information Discovery projects w3 Search is only one way we "discover information" at IBM. The TWE is working on a number of solutions to improve our results in many areas - content quality, profiling and presonalization, social networking and more play a role. [IBM wiki] |

| My assets |
|---|
| Submit asset |
| Submit asset |
| SOA+ Repository help |
| About SOA+ Repository |
| Submit Feedback |

| Refine Your search |
|---|

Click on a link below to filter your results
Type
+ Service (69)
+ Component (53)
+ Process module (4)
+ Workflow (3)
Scope
+ Business unit (24)
+ Enterprise (93)
+ Project (12)
Status
+ Under review (3)
+ In progress (123)
+ Complete (3)

| Related links |
|---|

+ ECBA Blueprint
+ XML Standards Repository
+ IBM Internal UDDI-P
+ Developer's Depot
+ Transforming IBM Search Results
On this page you can locate assets by searching via keyword or by browsing the existing asset categories shown in the left column. Searching via keyword returns matches to any words contained in an asset. You can browse assets by clicking on the category filters shown beneath the left navigator. Category filters may also be used in conjunction with a keyword search.

Search for [workflow] [GO]
☐ Search within results

Tip: You can use * anywhere in your search string to represent a multiple character wildcard. (e.g. Process mod*)

Your search and search results

Search results for: Any term

1 - 20 of 125 results sorted by name    Hide Details    1234567|Next

Name      Version    Type             Scope       Status        Last Updated
ACME      1.0        Process module   Project     Under review  16 Aug 2005
ACME is the content and entitlement engine that drives the PartnerWorld entitled website. It has a content management system responsible for the management of the creation, workflow approval, and update of content.

ACME      1.0        Component        Enterprise  In progress   03 Aug 2005
ACME is the content and entitlement engine that drives the PartnerWorld entitled website. It has a content management system responsible for the management of the creation, workflow approval, and update of content. A Content Delivery application delivers the content from the content database to the browser according to the entitlements the user has based on profile characteristics.

Requirement Feature → onFeature → Feature 1
                                → Feature 2
                                → Feature 3

Account   1.0        Service          Enterprise  In progress   03 Aug 2005
The Account service provides operations for account and password managment. Separate from the Person entity, the Account entity contains attributes related to login (userID, password, and various account status attributes).

Account Mgmt 1.0    Component        Enterprise  In progress   03 Aug 2005
The Account object in CRM/Siebel can be accessed and retrieved by using the Callable Services provided by this component. The component is based on the Account Business Object and it provides access to all the Account - related data from CRM, e.g., Account Number, Account Name, Coverage Model of the Account, Address, and information about the Account Team members.

Requirement — hasRequirment → Requirement
           ↙    ↓    ↘
    Requirement  Requirement  Requirement

METHOD AND APPARATUS FOR PREPROCESSING A PLURALITY OF DOCUMENTS FOR SEARCH AND FOR PRESENTING SEARCH RESULT

CROSS-REFERENCE TO RELATED APPLICATIONS

This application claims priority under 35 U.S.C. §119 to Chinese Patent Application No. 200610126579.1 filed Aug. 29, 2006, the entire text of which is specifically incorporated by reference herein.

BACKGROUND OF THE INVENTION

The present invention relates to information processing technology, more particularly, to a method and apparatus for preprocessing a plurality of documents for search, a method and apparatus for presenting search result as well as a system for searching documents that comprises these apparatuses.

Nowadays, search engines typically generate snippet of a document obtained by searching by extracting the partial content nearest to query keywords inputted by user, from the document, so as to present it to user as a search result. The snippet can give the user an immediate view about main topic of the document obtained by searching based on the query keywords, and then the user can determine if the document is relevant to his query according to his own requirements. An existing search engine method for generating snippet is called Nearest Words based Snippet Generating Method.

However, the Nearest Words based Snippet Generating Method can not give an overall picture of a document structure to user, and make the generated snippet lose the granularity (hierarchy of the document) information. Especially for long documents, which are very popular in enterprise environments such as learning materials, project whitepaper, the Nearest Words based Snippet Generating Method will generally not give the query user sufficient summary information of the documents obtained by searching, thereby not able to help the user to understand the main content of the documents very quickly.

Therefore, there is a need for a new method for generating snippet and presenting search result, to provide the query user with overviews of documents obtained by searching, so that the user can understand the overall picture of a document very quickly to determine relevance of the document with his query, thereby improving the browsing speed for the search result.

BRIEF SUMMARY OF THE INVENTION

The invention is proposed in view of the above problems in the prior art, the purpose of which is to provide a method and apparatus for preprocessing a plurality of documents for search, a method and apparatus for presenting search result and a system for searching documents that comprises these apparatuses, so that a tree-like snippet of the respective document in the search result can be presented to the user during document searching, thereby the user can obtain an overview of the respective document obtained by searching immediately and improve the browsing speed for the search result.

According to an aspect of the invention, there is provided a method for preprocessing a plurality of documents for search. The method includes, for each of said plurality of documents, generating a tree structure representing the content of the document, the tree structure comprises at least one node; and generating indexes for search for said plurality of documents, each entry of the indexes indicates therein at least one document associated with the entry and at least one associated node in the tree structure of the document.

According to another aspect of the invention, there is provided a method for presenting search result, the search result comprises at least one candidate document, and each of the at least one document is assigned a tree structure representing its content which comprises at least one node, the method comprising presenting at least a portion of the tree structure corresponded to the at least one candidate document in said search result.

According to another aspect of the invention, there is provided a method for searching documents, comprising searching to obtain a plurality of candidate documents based on user's query; and presenting the search result based on the method for presenting search result.

According to another aspect of the invention, there is provided an apparatus for preprocessing a plurality of documents for search. The apparatus includes a tree structure generating unit for generating, for each of said plurality of documents, a tree structure representing the content of the document, the tree structure comprises at least one node; and an indexes generating unit for generating indexes for search for the plurality of documents, each entry of the indexes indicates therein at least one document associated with the entry and at least one associated node in the tree structure of the document.

According to another aspect of the invention, there is provided an apparatus for presenting search result, the search result comprises at least one candidate document, and each of the at least one document is assigned a tree structure representing its content which comprises at least one node. The apparatus includes a tree structure obtaining unit for obtaining at least a portion of the tree structure corresponded to said at least one candidate document in the search result; and a presenting unit for presenting the at least a portion of the tree structure corresponded to the at least one candidate document obtained by the tree structure obtaining unit.

According to another aspect of the invention, there is provided an apparatus for searching a document, comprising: a searching unit for searching to obtain a plurality of candidate documents based on user's query; and said apparatus for presenting search result.

According to another aspect of the invention, there is provided a system for searching documents. The system includes the apparatus for preprocessing a plurality of documents for search, and the apparatus for searching documents.

BRIEF DESCRIPTION OF THE SEVERAL VIEWS OF THE DRAWINGS

FIG. 8 is an example illustrating the search result presented by the method for presenting search result of the invention;

DETAILED DESCRIPTION OF THE INVENTION

Figure 1:
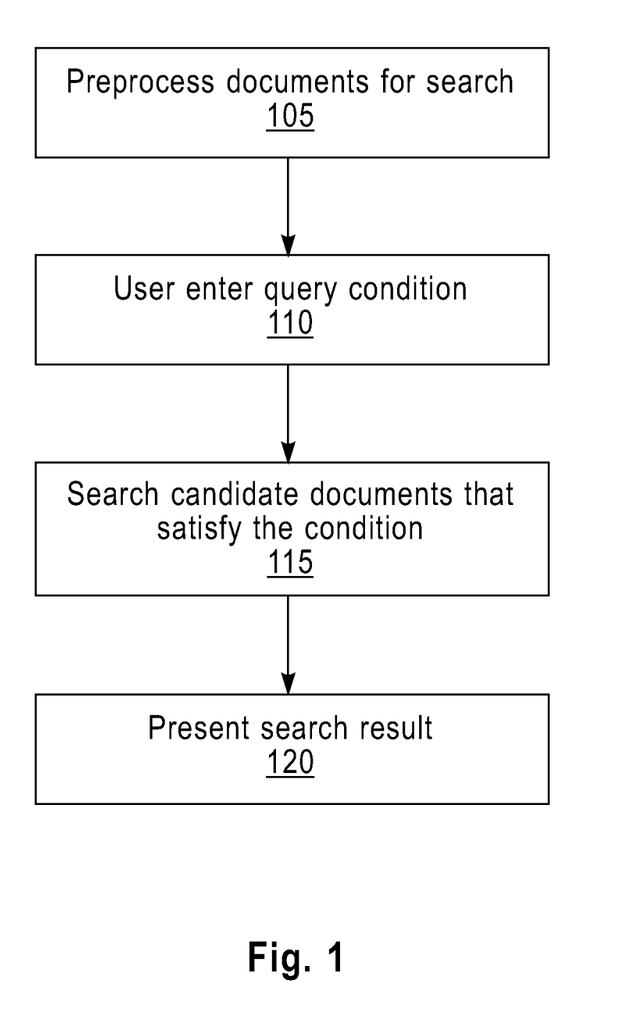
FIG. 1 is a flowchart illustrating a method for searching documents according to an embodiment of the invention.

FIG. 1 is a flowchart illustrating a method for searching documents according to an embodiment of the invention. As shown in FIG. 1, first at step 105, each of the documents for search is preprocessed to generate a tree structure representing the content of it, and indexes for search are generated for these documents and stored in a system database. The method for preprocessing documents for search at this step will be described in detail below.

At step 110, document query condition (query keywords) is entered by a user. In this embodiment, the query condition can be single word, words or terms contained in user interested content, or can be attributes which are tightly related to documents to be searched and which can be separately distinguished, that is, all content related to documents can be used as the search condition. It should be noted that the support for search condition is realized based on database capacity and matching logic of the search system, and since it is not the feature of the invention, the invention does not have any particular limitation on this step.

Next, at step 115, matching is performed between objects for matching of the indexes for search in the system database and query condition inputted by user, thereby candidate documents that satisfy the query condition are searched and obtained. The invention does not have any particular limitation on this step, and various search methods of prior art can be applied in the embodiment. As described above, however, in the embodiment, in addition to the indexes and other related data as prior art, in the database, there is also stored the tree structures of the documents for search generated by said preprocessing, and in the indexes as prior art, there is also added information related to node locations in corresponding tree structures. All these will be described in detail in the following description of embodiments.

At step 120, search result generated based on said candidate documents is presented. Specifically, at this step, portions related to the above query condition in tree structures corresponding respectively to these candidate documents are obtained and presented as search result. Further, in other embodiments, the entireness of the tree structures corresponding respectively to these candidate documents can be presented.

In addition, it should be noted that, at this step, snippets generated by extracting the partial content nearest to said query keywords from the above candidate documents with the Nearest Words based Snippet Generating Method can also be presented at the mean time.

The method for presenting search result at this step will be described in detail below.

In addition, it should be noted that, step 105 and steps 110-120 in this embodiment may be independent to each other on time, that is, the step of preprocessing may be performed daily, weekly or according to other periods, while the steps of querying and presenting may be performed according to user's needs.

Next, the method for preprocessing documents for search at step 105 of FIG. 1 will be described in detail in conjunction with FIGS. 2-6.

Figure 2:
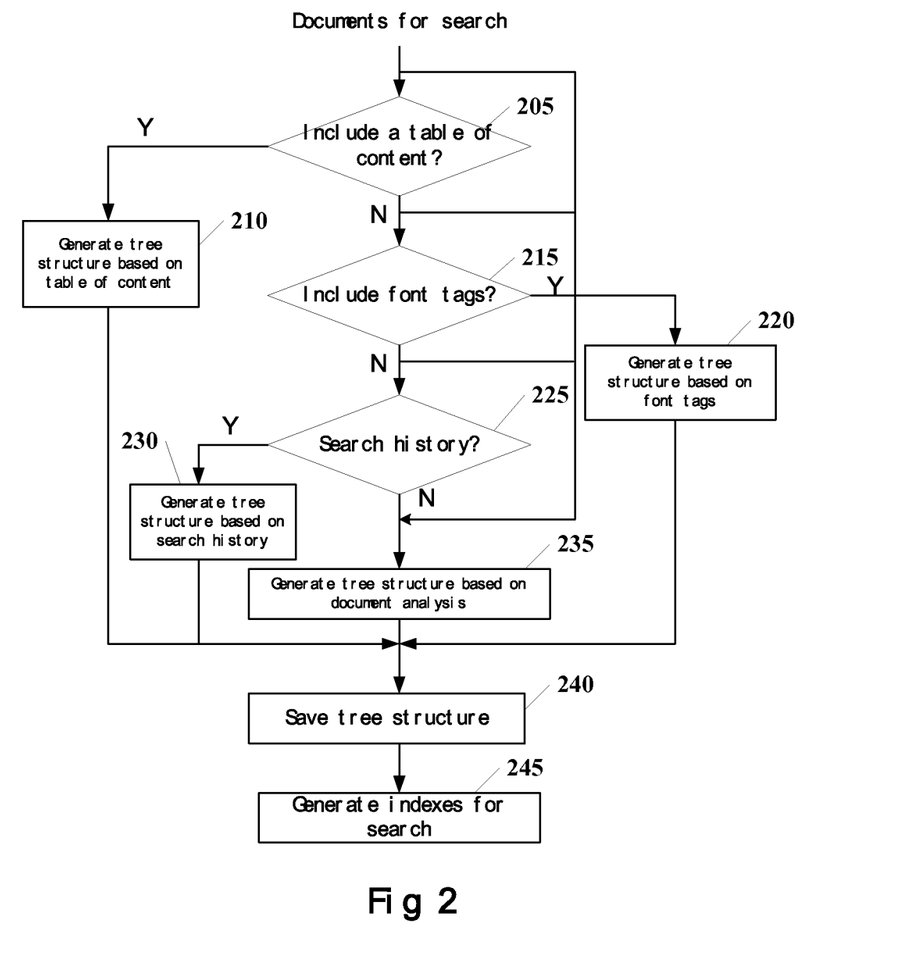
FIG. 2 is a flowchart illustrating a method for preprocessing a plurality of documents for search according to an embodiment of the invention.

FIG. 2 is a flowchart illustrating a method for preprocessing a plurality of documents for search according to an embodiment of the invention. As shown in FIG. 2, at the first phase, i.e., step 205 to step 240, for each of the plurality of documents for search, a tree structure represents the content of the document is generated.

Specifically, at step 205, it is determined if said document contains a table of content. If so, the process proceeds to step 210, otherwise, to step 215.

At step 210, a corresponding tree structure is generated as a tree structure that representing the content of the document based on the table of content of the document.

Specifically, first, from the above document containing a table of content, as tree structure extraction object, the table of content is extracted. In general, because table of content, which is a structural description of document content, is created by author himself/herself, it can be considered that the structure of the document content reflected by the table of content is accurate.

Then, based on content and hierarchical structure of the extracted table of content, a corresponding tree structure is generated as the tree structure that represents the content of the document.

In the embodiment, the tree structure that represents the content of the document is generally a hierarchical tree structure, which contains one root node and one or more leaf nodes, sometimes also contains one or more intermediate nodes, wherein each node includes the following content:

1) title: it can be null. If original document contains a self-defined directory, then the directory is taken as title, if the original document does not contain a directory, the title is set as null;

2) a set of keywords corresponding to the node: it can not be null. The tree-like structure and nodes therein, no matter how extracted they are, should record keywords of corresponding paragraphs in original document, that is, the set of keywords remained after extracting and filtering the text of the corresponding paragraphs;

3) other information, for example: locating at which paragraph in original document, number of words etc. It can be defined by user himself/herself based on actual situation (granularity requirement of the snippet).

Next, the process of generating a tree structure for a document based on a table of content of the document is illustrated by way of example.

Figure 3A:
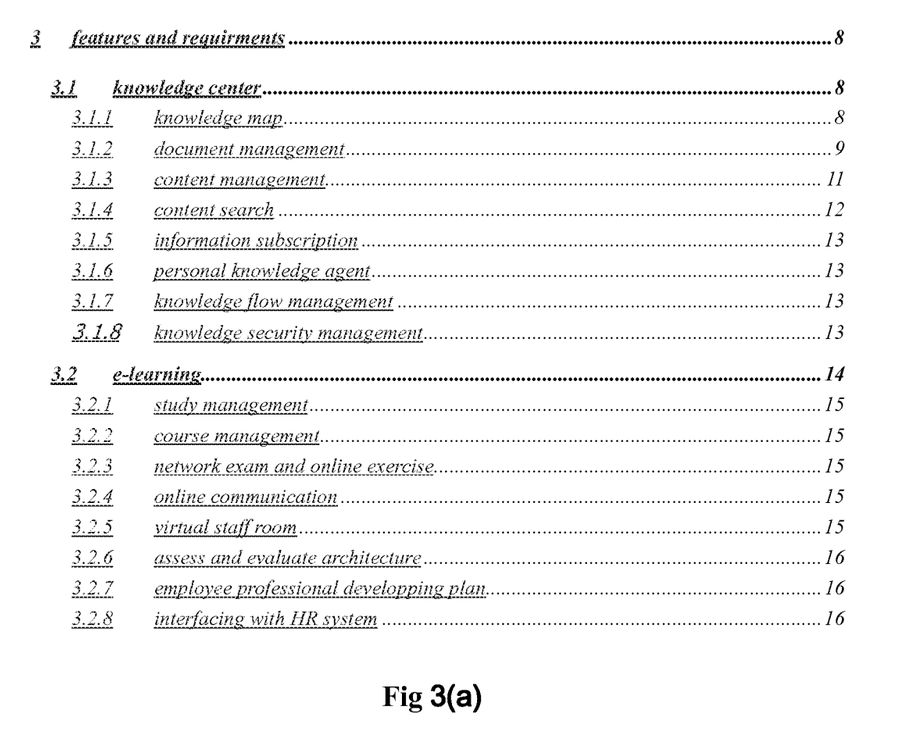
FIG. 3 is a diagram illustrating a method for generating a tree structure for a document based on a table of content in the method for preprocessing a plurality of documents for search according to an embodiment of the invention.

FIG. 3 is a diagram illustrating a method for generating a tree structure for a document based on a table of content in the method for preprocessing a plurality of documents for search according to an embodiment of the invention. The process is described, taken the table of content of the document shown in FIG. 3(a) as an example. As shown in FIG. 3, the table of content of the document comprises several chapters each further comprising several sections. When generating a tree structure based on the table of content, the entire document is mapped as a root node in the tree structure, each chapter in the table of content is mapped as a corresponding intermediate node in the tree structure, and each section contained in a chapter is mapped as a leaf node descending from the node corresponding to the chapter in the tree structure.

Figure 3B:
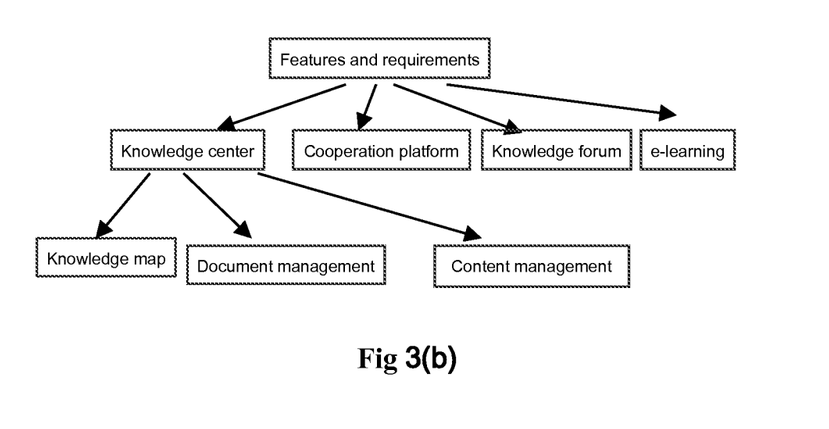
Figure 3C:
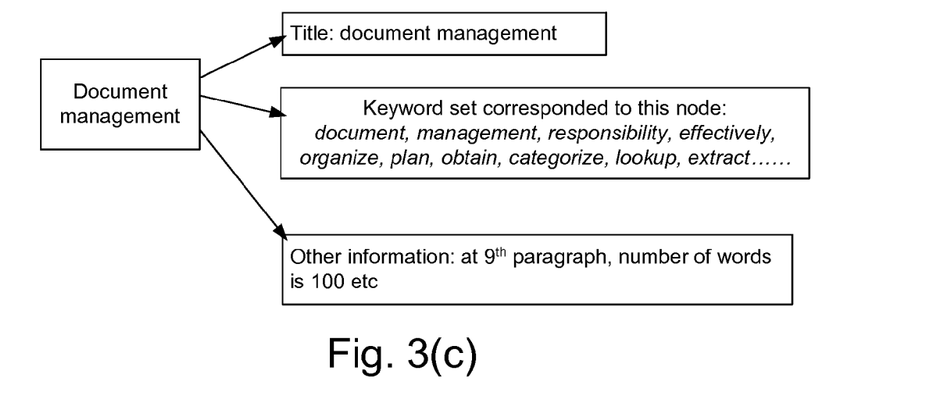

A portion of the tree structure thus extracted is shown in FIG. 3(b). Wherein, each node in the tree structure comprises title, a set of keywords corresponding to the node and other information. Taking "document management" node in FIG. 3(b) as an example, as shown in FIG. 3(c), the title of the node is "document management", the set of keywords corresponding to the node contains "document", "management", "responsibility", "effectively", "organize", "plan", "document", "obtain", "categorize", "lookup", "extract" etc, and the other information corresponding to the node are: locating at 9th paragraph in original document, the number of words is 100, etc.

For a document containing a table of content, the method of generating a tree structure representing the content of the document based on the table of content is very practical, and since the method generates corresponding tree structure based on original content structure of the document, the generated tree structure is both accurate and comprehensive on describing for document content, thereby generation efficiency of tree structure can be enhanced by using the method.

In addition, it should be noted that the form of the above tree structure in the embodiment is merely illustrative, but not intended to limit the form of the tree structure in the invention, and any form, by which the purpose of the invention can be achieve, can be employed.

Next, return to FIG. 2, at step 215, it is determined if the document contains font tags that indicate section titles in the document. If so, the process proceeds to step 220, otherwise, to step 225.

At step 220, a corresponding tree structure is generated as tree structure representing content of the document based on the font tags that indicate the section titles in the document.

The so-called font tags are tags that indicate section subtitles in a document in markup language, such as Strong/H1/H2/H3 in a html file, etc.

Figure 4:
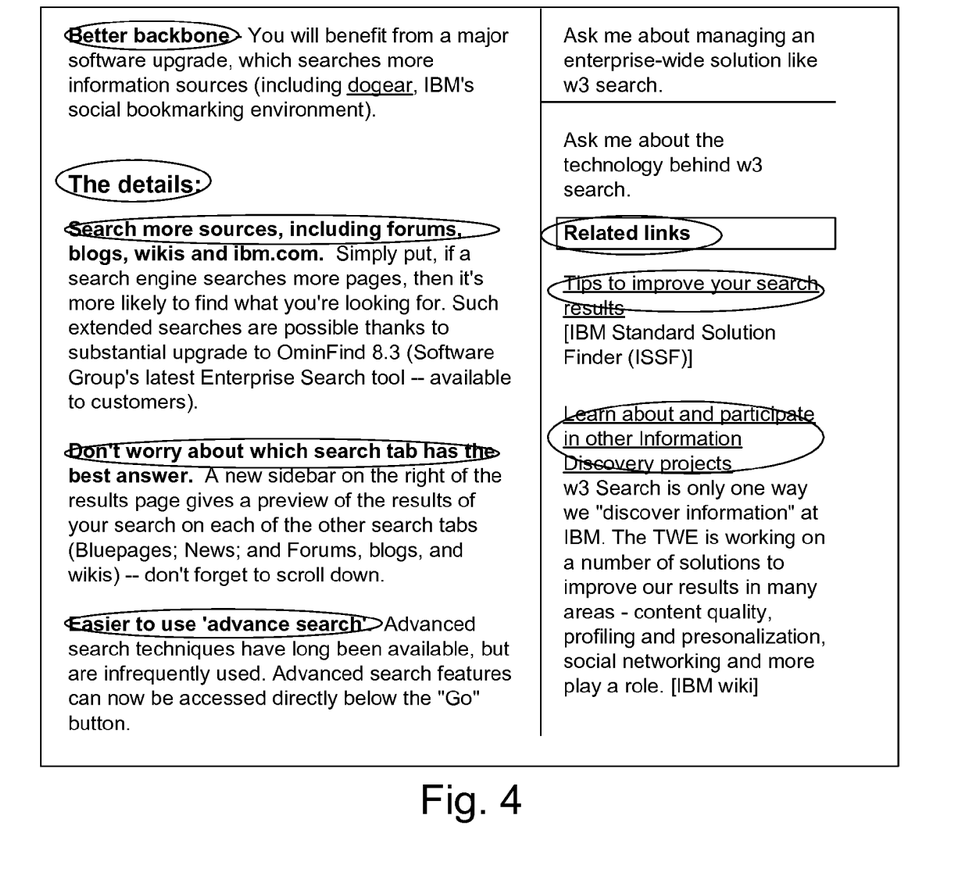
FIG. 4 is a diagram illustrating a method for generating a tree structure for a document based on font tags in the method for preprocessing a plurality of documents for search according to an embodiment of the invention.

FIG. 4 is a diagram illustrating a method for generating a corresponding tree structure for a document based on font tags in the method for preprocessing a plurality of documents for search according to an embodiment of the invention.

As shown in FIG. 4, first, from the above document containing font tags that indicate section titles, as tree structure extraction object, the font tags are extracted. In general, because the font tags, which are structural descriptions of document content, are created by author himself/herself, it can be considered that the structure of the document content reflected by the font tags is accurate. So the accuracy of the content represented by the tree structure can be assured.

Then, based on content and hierarchical structure of the extracted font tags, a corresponding tree structure is generated as the tree structure that represents the content of the document. At this step, the form of the generated tree structure is the same as that of the tree structure described with respect to step 210 and it won't be described repeatedly here.

For a document containing font tags, the method of generating a tree structure representing the content of the document based on the font tags is very practical, and since the method generates corresponding tree structure based on original content structure of the document, the generated tree structure is both accurate and comprehensive on describing for document content, thereby the generation efficiency of tree structure can be enhanced by using the method.

Next, return to FIG. 2, at step 225, it is determined if there is a record for previous search history for the document. If so, the process proceeds to step 230, otherwise, to step 235.

At step 230, a tree structure that represents content of the document is generated based on previous search history record of the document. The step will be described in detail in conjunction with FIG. 5 below.

Figure 5:
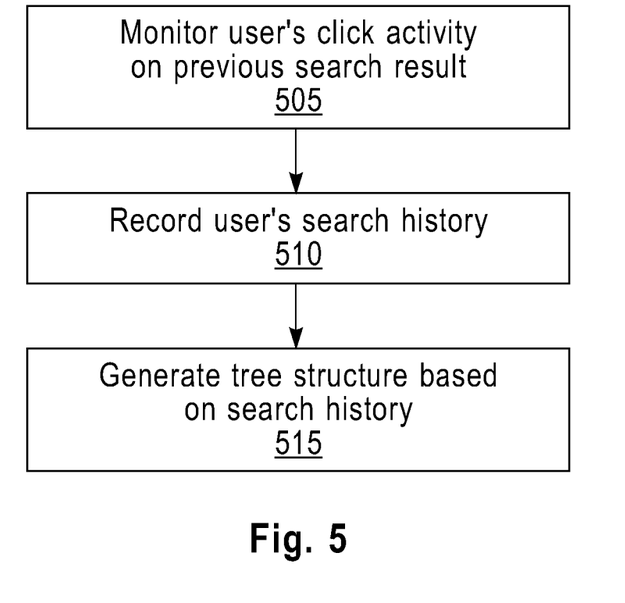
FIG. 5 is a flowchart illustrating a method for generating a tree structure for a document based on search history in the method for preprocessing a plurality of documents for search according to an embodiment of the invention.

FIG. 5 is a flowchart illustrating a method for generating a corresponding tree structure for a document based on search history in the method for preprocessing a plurality of documents for search according to an embodiment of the invention. As shown in FIG. 5, at first phase, i.e. step 505 and 510, user's search history on the document is first recorded. Specifically, at step 505, each time when user has performed a searching by using query keywords, the keywords are recorded and user's click activities on search result obtained based on the query keywords are monitored. Each time after documents are obtained based on query keywords inputted by user, user generally will click an interested document according to its snippet and spend reasonable time on reading it. Therefore, at this step, user's click activities on respective documents in the search result are monitored.

Next, at step 510, for a document clicked by user during this search, identification of the document, keywords used in this search and content related to the query keywords in the document are recorded in form of Table 1.

TABLE 1

| $Doc_1$ | $Q_{1,1}$ | $P_{1,1}$ | $Q_{1,2}$ | $P_{1,2}$ | ... | $Q_{1,n}$ | $P_{1,n}$ |
|---|---|---|---|---|---|---|---|
| $Doc_2$ | $Q_{2,1}$ | $P_{2,1}$ | $Q_{2,2}$ | $P_{2,2}$ | ... | $Q_{2,n}$ | $P_{2,n}$ |
| $Doc_3$ | $Q_{3,1}$ | $P_{3,1}$ | $Q_{3,2}$ | $P_{3,2}$ | ... | $Q_{3,n}$ | $P_{3,n}$ |
| ... | ... | ... | ... | ... | ... | ... | ... |
| $Doc_k$ | $Q_{k,1}$ | $P_{k,1}$ | $Q_{k,2}$ | $P_{k,2}$ | ... | $Q_{k,n}$ | $P_{k,n}$ |

Wherein, $Q_{i,j}$ is the jth query keyword with respect to document $Doc_i$, $P_{i,j}$ is the part (document content) which is specific to query keyword $Q_{i,j}$ in document $Doc_i$. $P_{i,j}$ is the collection of snippets related to query keyword $Q_{i,j}$ that are generated for document $Doc_i$ by using traditional Nearest Words based Snippet Generating Method. $P_{i,j}$ is a list, that is, one query keyword $Q_{i,j}$ may correspond to a plurality of content parts in document $Doc_i$.

At step 515, based on the search history for the document, by using keywords therein that related to the document, a corresponding tree structure is generated with reference to a word dictionary, as the tree structure representing the content of the document.

In general, the query keywords, inputted by user, are of course the content that is tightly related to document content and that can present document subject. For a document, the query keywords, inputted by a great deal of users in a great deal of search processes, are of course the core content of the document. Thus, the overall content of the document can be fully presented by the tree structure generated with the previous query keywords. Therefore, the information recorded in the search history can be directly used to generate a tree structure representing the document content.

In addition, since a word dictionary (for example WordNet dictionary, etc) itself has already defined hierarchy of the content therein, so at this step, by using the related keywords obtained in search history for the document, a corresponding tree structure is generated directly with reference to the hierarchy of these keywords defined in the word dictionary.

In addition, at this step, the form of the generated tree structure is the same as that described with respect to step 210 and it won't be described repeatedly here.

Additionally, in another embodiment, the method for generating a tree structure representing content of a document based on search history shown in FIG. 5 may further comprises following steps: periodically updates the tree structure of the document based on the search history for the document. The update period can be set arbitrarily, for example, one week or one month etc. Updating periodically can make the document content reflected by the tree structure of the document tend to be more comprehensive.

For a document that has search history records, the method of generating a tree structure representing the content of the document based on the stored search history records is very practical, especially for a long document that contains many content blocks, since its previous search history records typically involve not only to a content block related to one keyword, but also to a plurality of content blocks related to different keywords, the generated tree structure is relatively accurate and comprehensive on describing for document content, thereby the generation efficiency of tree structure can be enhanced by using the method.

It should be noted that, in the process of generating a tree structure for a document based on previous search history described above in conjunction with FIG. 5, it is for the purpose of convenience that the first phase of recording search history and the second phase of generating tree structure based on the search history are described together, however, in actual implementation, the two phases may not related to each other on time, and the first phase may be performed in real time at system background, while the second phase may be performed when user submitting a query.

Next, return to FIG. 2, at step 235, a tree structure representing the content of the document is generated based on analysis for the content of the document.

At this step, generating a tree structure representing the content of the document based on analysis for the document is to find out a plurality of paragraphs in the document that are similar in content (their topics are the same), and merge them into one topic unit which is mapped to one leaf node in the tree structure representing the content of the document. And, a plurality of topic units, that are similar in content among the merged topic units, are further merged into one bigger topic unit which is mapped to one intermediate node in the tree structure, and the above process is repeated to form the hierarchy of the document, until an overall tree structure representing the content of the document is obtained.

Figure 6:
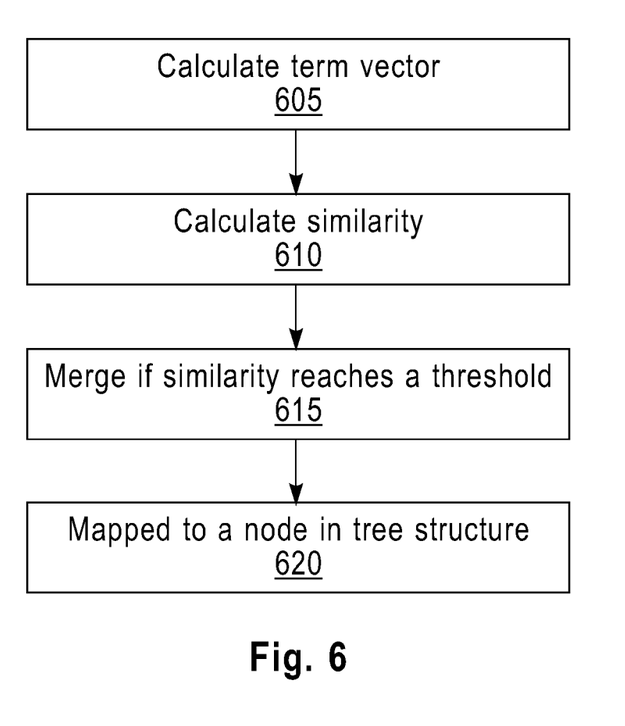
FIG. 6 is a flowchart illustrating a method for generating a tree structure for a document based on document analysis in the method for preprocessing a plurality of documents for search according to an embodiment of the invention.

The process will be described in detail in conjunction with FIG. 6. FIG. 6 is a flowchart illustrating a method for generating a tree structure of a document based on document analysis in the method for preprocessing a plurality of documents for search according to an embodiment of the invention. As shown in FIG. 6, first at step 605, for each paragraph in the document, a term vector is generated.

At this step, for example, suppose there are m paragraphs $\{c_1, \ldots, c_i, \ldots c_m\}$ and total N terms $\{t_1, \ldots, t_N\}$ in the document, then for each paragraph $c_i$, the following term vector can be generated to represent this paragraph:

$$\vec{v}_{c_i} = \{w_{i,1}, \ldots, w_{i,N}\},$$

wherein, $w_{i,j}$ is the weight of the jth term in the paragraph $c_i$, it can be calculated as:

$$w_{i,j} = tf_{i,j} * idf_j \qquad (1),$$

wherein, $tf_{i,j}$ is the frequency of term $t_j$ in paragraph $c_i$, and $idf_j$ is the inverse frequency of term $t_j$ in the document. $idf_j$ can be calculated by:

$$\log\left(\frac{K}{k_j}\right),$$

wherein, K is the total number of the paragraphs in the document, and $k_j$ is the number of the paragraphs containing the term $t_j$ in the document.

Next, at step 610, similarities of each two of consecutive paragraphs in the document are calculated based on the term vector of respective paragraphs in the document.

At this step, for the two paragraphs in the document, such as $c_i$ and $c_l$, the similarity between them can be calculated as:

$$Sim(c_i, c_l) = \cos(\theta_{i,l}) = \frac{\sum_{j=1}^{N} w_{i,j} * w_{l,j}}{\sqrt{\sum_{j=1}^{N} w_{i,j}^2} * \sqrt{\sum_{j=1}^{N} w_{l,j}^2}}, \qquad (2)$$

wherein, $Sim(c_i, c_l)$, which represents the similarity between paragraphs $c_i$ and $c_l$, is the cosine of the angel between the term vector $\vec{v}_{c_i}$ and $\vec{v}_{c_l}$ of paragraphs $c_i$ and $c_l$; its value is in the range of [0,1]

When the two paragraphs $c_i$ and $c_l$ have the same terms and weight, the term vectors of these two paragraphs will be the same, the angle between them is 0 degree, thus the calculated similarity between these two paragraphs will be 1; otherwise, if there is no common terms between the two paragraphs $c_i$ and $c_l$, then the term vectors of these two paragraphs will be totally different, the angle between them is 90 degree, thus the calculated similarity between these two paragraphs will be 0.

At step 615, the consecutive paragraphs that the similarities of each two of them reach a defined threshold are merged into one topic unit.

If the similarity of two paragraphs is 1, it means that they have same term vector, that is, they have same terms and weight, it can be determined that the content of the two paragraphs is about a same topic; otherwise, if the similarity of two paragraphs is 0, it means that they have different term vector, that is, they have different terms, it can be determined that the content of the two paragraphs is not about a same topic.

Therefore, at this step, based on the similarities $Sim(c_i, c_l)$ of each two of the consecutive paragraphs in the document calculated at the above step 610, it is determined if they exceed the defined threshold, if so, these consecutive paragraphs are merged into one topic unit.

At step 620, the above merged topic unit is mapped to one leaf node in the tree structure representing the content of the document.

It should be noted that, the process of the above steps 605-620 is only the process to generate a leaf node in the tree structure representing the content of the document based on document analysis, while the plurality of merged topic units can also be further merged to form hierarchical tree structure of the document.

Therefore, the process of the above steps 605-620 are repeated, taking the merged topic units as objects. Specifically, at step 605, for each of these merged topic units, a term vector is generated. For example, if topic unit $S_{i,x}$ is merged by x pieces of paragraphs, then the term vector $\vec{v}_{S_{i,x}}$ of that topic unit can be calculated by:

$$\vec{v}_{s_x} = \frac{1}{x} \sum_{p=0}^{x-1} v_{c_i+p},$$

alternatively, topic unit $S_{i,x}$ can be treated as a paragraph and its term vector is calculated with the above formula (1).

At step 610, similarities of each two of consecutive merged topic units in the document are calculated based on the term vector of respective topic units.

At step 615, the consecutive topic units that the similarities of each two of them reach the defined threshold are further merged into one topic unit.

At step 620, the merged topic unit is mapped to one intermediate node in the tree structure representing the content of the document.

The process of 605-620 is iterated until an overall tree structure representing the content of the document is obtained.

It should be noted that, the method for generating a tree structure based on document analysis in FIG. 6 is suitable for any document in any form, regardless of whether the document has directory, title tags or search history records, it is a common method in the invention to generate a tree structure representing the content of the document.

In addition, at step 235, the form of the tree structure generated by using the method for generating a tree structure based on document analysis in FIG. 6 is the same as that described with respect to step 210 and it won't be described repeatedly here.

In addition, it should be noted that, in the description on the first phase in conjunction with FIG. 2, it is for the purpose of convenience that step 210 of generating a tree structure based on a table of content, step 220 of generating a tree structure based on font tags, step 230 of generating a tree structure based on search history, and step 235 of generating a tree structure based on document analysis are described in certain order, however, in actual implementation, these steps are equally carried out and there is no order limitation on time, nor dependencies between each other. That is, when generating a tree structure representing content of a document for search, one of the above four steps that is suitable for the document is selected to carry out according to actual conditions.

In addition, in another embodiment, it is also possible that these four steps (methods) of generating tree structure are not included simultaneously and one of the steps may be omitted.

Next, return to FIG. 2, at step 240, the tree structures representing content of the document generated for the document and the document are stored in association in the form of Table 2.

TABLE 2

| Doc1 | Content Tree 1 |
|---|---|
| Doc2 | Content Tree 2 |
| Doc3 | Content Tree 3 |
| ... | ... |
| Dock | Content Tree k |

It should be noted that the form of storing for the tree structure in the above Table 2 is merely illustrative, and in actual implementation, the form of storing for the tree structure may be various. For example, in the present embodiment, the tree structure of the document is represented in form of a XML (Extensible Markup Language) file, and the document and its tree structure are stored in association in a system database, so that when a user performs a searching, a tree-like snippet is formed and presented to the user, thereby the user who submitted the query can quickly obtain an overview of the document.

Next, at the second phase, i.e., step 245, indexes for search are generated for the plurality of documents. At this step, on the basis of a conventional method for generating indexes (e.g., keyword inverted indexes), by using the tree structures respectively generated for the plurality of documents for search at the first phase, within each entry respective for the indexes, in addition that the documents for search associated with the entry are indicated, the associated nodes within the tree structures of these documents are also indicated.

Specifically, in the present embodiment, on the basis of conventional inverted indexes, one additional field will be added into each entry of the indexes to indicate associated nodes within the tree structures of the documents associated with that entry. First, the conventional inverted indexes will be introduced in the following.

Suppose two documents 1 and 2, and the content of document 1 is: "Tom lives in Guangzhou, I live in Guangzhou too."; and the content of document 2 is: "He once lived in Shanghai.".

To establish inverted indexes for these two documents, the keywords of the two documents should be acquired first. Specifically, it is performed in accordance with the following considerations.

First, in the case of current document content, i.e., character string, all of the words in the string should be found out, that is, word splitting. Generally, in case of English, since English words are separated each other by spaces, it is relatively easy to handle. However, because Chinese words are joined sequentially together, special word splitting process is needed. In addition, in general, "in", "once", "too" etc in English document have no any actual sense, and "的", "是" etc in Chinese document also have no specific meanings, so these words can be filtered out of keywords.

In addition, user typically hopes to also find the documents that contain "he", "HE" when submitting "He", so lowercase and uppercase need to be unified for all the words. Further, user typically hopes to also find the documents that contain "lives", "lived" when submitting "live", so "lives", "lived" need to be restored as "live". Furthermore, the punctuations in a document typically do not represent any certain meaning and they can be filtered out.

Based on the above considerations, all the keywords of document 1 will be: [tom], [live], [guangzhou], [i], [live], [guangzhou]. And all the keywords of document 2 will be: [he], [live], [shanghai].

After keywords of document 1 and 2 are found out, the inverted indexes can be established. The correspondence between respective documents with its keywords above is: "document number" vs. "all of the keywords in the document", while in inverted indexes, this correspondence is inverted as: "keyword" vs. "all of the numbers of documents containing the keyword". Thus, after inverting, the inverted indexes of document 1 and 2 will become the form of Table 3:

TABLE 3

| keyword | Doc number |
|---|---|
| Guangzhou | 1 |
| He | 2 |
| I | 1 |
| Live | 1, 2 |
| Shanghai | 2 |
| Tom | 1 |

Generally, only to know which documents a keyword appears in is not enough, fields like number of times and locations the keyword appears in the document also need to be added into the inverted indexes.

While in the present embodiment, the simplest form of inverted indexes shown in the above Table 3 is taken as a basis, a field is added into each entry to indicate associated nodes within the tree structures of the documents associated with that entry, so as to record locations of that entry's keyword in the tree structures. And the locations can be represented by pointers respectively pointing to a corresponding node that contains the keyword in the tree structures. Specifically, the form of indexes of the present embodiment is shown as Table 4:

TABLE 4

| Key-Word1 | Doc1, 1 | P1, 1 | Doc 1, 2 | P1, 2 | ... | Doc 1, n | P1, n |
|---|---|---|---|---|---|---|---|
| Key-Word2 | Doc2, 1 | P2, 1 | Doc 2, 2 | P2, 2 | ... | Doc 2, n | P2, n |
| Key-Word3 | Doc3, 1 | P3, 1 | Doc 3, 2 | P3, 2 | ... | Doc 3, n | P3, n |
| ... | ... | ... | ... | ... | ... ... | ... |
| Key-Wordk | Doc k, 1 | Pk, 1 | Doc k, 2 | Pk, 2 | ... | Doc k, n | Pk, n | wherein, $P_{i,j}$ is a pointer pointing to a node that contains keyword i in the tree structure of document $Doc_{i,j}$ (Table 2). And $P_{i,j}$ may be a pointer list, that is, one query keyword i may correspond to a plurality of nodes that contain the keyword in tree structure of document $Doc_{i,j}$.

It should be noted that the above description has been illustrated taking keyword inverted indexes as example, however, the present invention has no specific limitation on the form of indexes, and any known and future index form, such as direct index form, category index form etc, can be employed. Also, the field that indicates locations of each entry's keyword in tree structures of corresponding documents is implemented with pointers, but in other embodiments, the field can also be implemented in other forms, such as in node identification form etc.

The foregoing is the description of the method for preprocessing a plurality of documents for search of the present embodiment.

Next, the method for presenting search result at step 120 of FIG. 1 is described with reference to FIG. 7-8.

Figure 7:
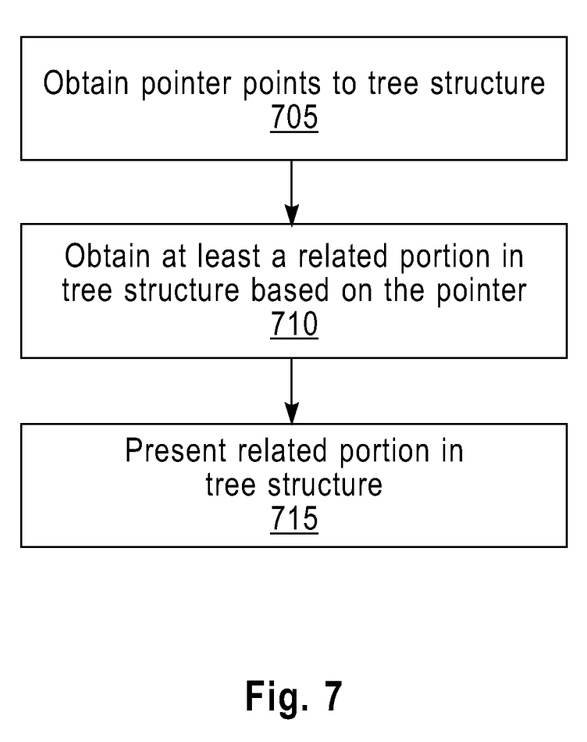
FIG. 7 is a flowchart illustrating a method for presenting search result according to an embodiment of the invention.

FIG. 7 is a flowchart illustrating a method for presenting search result according to an embodiment of the invention. It should be noted that the method for presenting search result of the present embodiment is performed based on the foregoing method for preprocessing a plurality of documents for search. Also, as described above, the search result is candidate documents satisfying query condition which are searched from indexes for search in system database, and these candidate documents, after preprocessing, are respectively assigned a tree structure representing its content, and in entries of these candidate documents in the indexes for search, pointers are used to point to nodes that contain the query condition (query keywords) in the tree structure of respective candidate documents.

As shown in FIG. 7, first at step 705, for each candidate document, the pointer pointing to node that contains the query keyword in the tree structure of it is obtained from entry of the query keyword in the indexes for search (Table 4).

Wherein, the pointer pointing to node that contains the query keyword in the tree structure of the candidate document may be a pointer list, that is, points to a plurality of nodes that contain the query keyword in the tree structure, in this case, the pointer list is obtained.

At step 710, for each candidate document, associated nodes in the tree structure of it (Table 2) are obtained according to the above pointer (pointer list) to form at least a portion of the tree structure.

Specifically, at this step, a sub-tree that contains the node pointed by the pointer as well as that node's sibling nodes and parent node in the tree structure is obtained.

In addition, in case of pointer list, a maximal sub-tree that contains the plurality of nodes pointed by the pointer list in the tree structure is obtained.

At step 715, the portions obtained from the tree structures corresponded to the candidate documents and corresponding snippets of these candidate documents are presented.

Wherein, the corresponding snippet of respective candidate documents is generated by extracting the partial content nearest to the query keyword from the candidate document with the Nearest Words based Snippet Generating Method.

FIG. 8 is a snapshot illustrating the search result presented by the method for presenting search result of the invention. As shown in FIG. 8, when a query keyword "workflow" is entered, search result that contains snippets and corresponding tree structures of documents as shown is presented.

It can be seen that, by using the present embodiment, more information about documents can be presented to user within the limited display space, so that user can get to know summary information about a document without opening or downloading the original document.

In addition, in the present embodiment, what presented are the portions that contain query keyword in corresponding tree structures of the candidate documents, in other embodiments, however, it is also possible to directly represent entireness of the corresponding tree structures of the candidate documents. Alternatively, for example, when user has selected a document in the search result, the entireness of the tree structure of the document may further be displayed.

In addition, in the present embodiment, for each candidate document, the snippet generated by extracting the partial content nearest to the query keyword from it with the Nearest Words based Snippet Generating Method is simultaneously presented in the search result. However, in other embodiments, it is also possible not to present the snippet, but only to present tree structures of the candidate documents in search result.

The foregoing is a description of the method for searching documents of the present embodiment. The present invention first generates a tree structure representing content for each of the document for search at preprocess stage, and generates indexes for search for these documents, each entry of which indicates associated nodes in the tree structures of the documents associated with that entry. Thus, at search stage, documents associated with query keyword and corresponding nodes of their tree structures can be obtained according to the indexes for search, so that snippets of the documents obtained by searching can be presented in the search result.

Therefore, in the present embodiment, since each document is presented by tree-like snippet in search result, which not only contains information related to query keyword of the document, but also contains other key information about the content of the document, more document information can be presented to user within a limited display space, thereby user can obtain an overview of the document without opening or downloading the original document, so that relevance of the document with user's query can be rapidly determined, and browsing speed for the search result can be improved.

Figure 9:
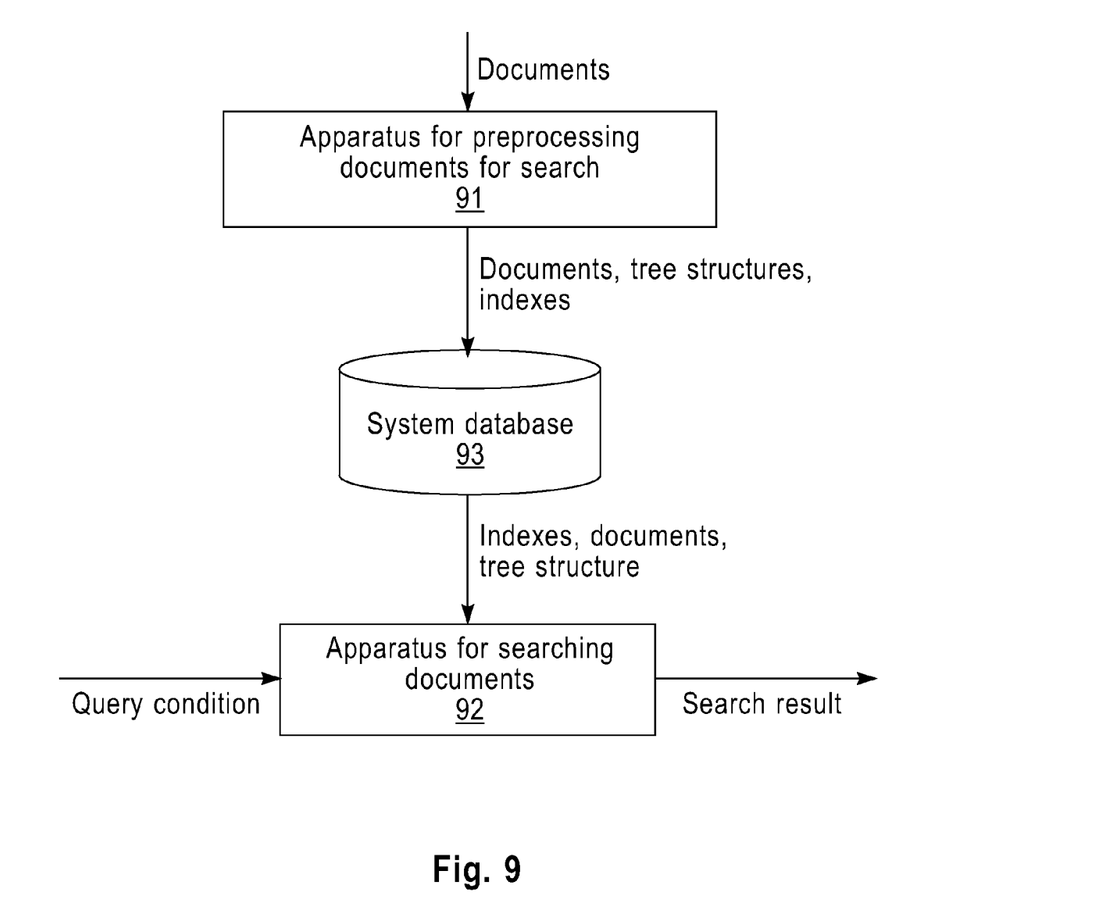
FIG. 9 is a block diagram illustrating a system for searching documents according to an embodiment of the invention.

Under the same inventive conception, FIG. 9 is a block diagram illustrating a system for searching documents according to an embodiment of the invention.

As shown in FIG. 9, the system 90 for searching documents of the present embodiment comprises: an apparatus 91 for preprocessing a plurality of documents for search, an apparatus 92 for searching documents and a system database 93.

The apparatus 91 for preprocessing a plurality of documents for search is used to preprocess each of the documents for search to generate a tree structure representing content of the document, as well as generate indexes for search for these documents and store them in the system database 93.

Figure 10:
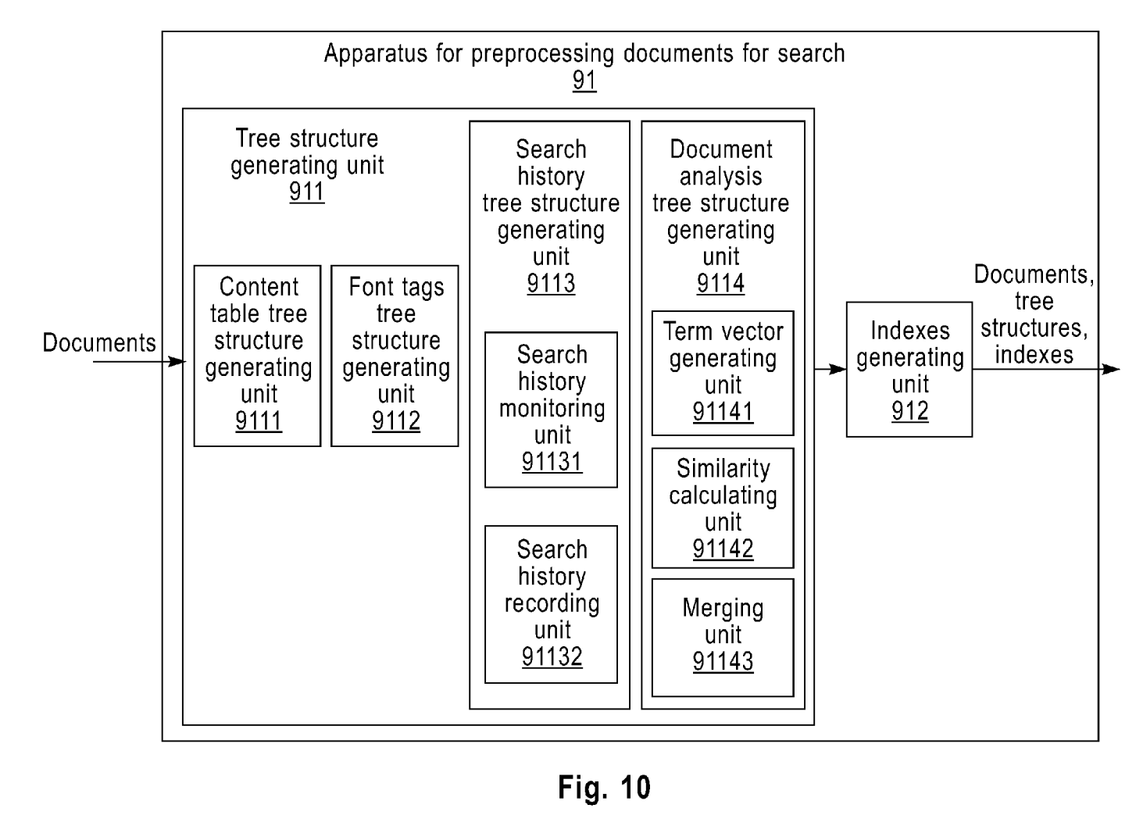
FIG. 10 is a block diagram illustrating an apparatus for preprocessing a plurality of documents for search according to an embodiment of the invention.

FIG. 10 is a block diagram illustrating an apparatus for preprocessing a plurality of documents for search according to an embodiment of the invention. As shown in FIG. 10, the apparatus 91 for preprocessing a plurality of documents for search of the present embodiment comprises a tree structure generating unit 911 and an indexes generating unit 912.

The tree structure generating unit 911 is used to, for each of the plurality of documents for search, generate a tree structure representing the content of it. As shown in FIG. 10, the tree structure generating unit 911 further comprises a content table tree structure generating unit 9111, a font tag tree structure generating unit 9112, a search history tree structure generating unit 9113 and a document analysis tree structure generating unit 9114.

The content table tree structure generating unit 9111 is used to, for each of the plurality of documents that contain a table of content, extract the table of content therein, and generate a corresponding tree structure based on the content and hierarchy of the extracted table of content, as the tree structure representing the content of the document.

The font tag tree structure generating unit 9112 is used to, for each of the plurality of documents that contain font tags that indicate section titles, extract the font tags therein, and generate a corresponding tree structure based on the content and hierarchy of the extracted font tags, as the tree structure representing the content of the document.

The search history tree structure generating unit 9113 is used to, for a document, based on its search history, with keyword therein that related to the document, generate a corresponding tree structure with reference to a word dictionary, as the tree structure representing the content of it. As shown in FIG. 10, the search history tree structure generating unit 9113 further comprises a search history monitoring unit 91131 and a search history recording unit 91132.

The search history monitoring unit 91131 is used to monitor user's click activity on documents obtained after user's previous query with query keyword each time.

The search history recording unit 91132 is used to, for a document clicked by user in a previous query, record in association identification of the document, the present query keyword and content related to the query keyword in the document.

Next, the document analysis tree structure generating unit 9114 is used to merge a plurality of paragraphs (topic units) in a document that are closed in content (same topic) with each other into one topic unit which is mapped to one leaf (intermediate) node in the tree structure representing the content of the document. As shown in FIG. 10, the document analysis tree structure generating unit 9114 further comprises: a term vector generating unit 91141, a similarity calculating unit 91142 and a merging unit 91143.

The term vector generating unit 91141 is used to generate a term vector for each paragraph (topic unit) in said document. The algorithm for generating a term vector employed by the term vector generating unit 91141 has been described in detail with reference to FIG. 6 and it won't be repeated here.

The similarity calculating unit 91142 is used to calculate similarities of each two of consecutive paragraphs (topic unit) in the document based on the term vector of respective paragraphs (topic units) in the document. The algorithm for calculating similarities of each two of consecutive paragraphs (topic unit) employed by the similarity calculating unit 91142 has been described in detail with reference to FIG. 6 and it won't be repeated here.

The merging unit 91143 is used to merge the consecutive paragraphs (topic units) that the similarities of each two of them reach a defined threshold into one topic unit, so that the document analysis tree structure generating unit 9114 will map it to a node in the tree structure representing the content of the document.

The indexes generating unit 912 is used to generate indexes for search for the plurality of documents for search and store them in the system database 93. Specifically, the indexes generating unit 912 adds information related to node location in corresponding tree structure on the basis of conventional indexes.

It should be noted that the above described content table tree structure generating unit 9111, font tag tree structure generating unit 9112, search history tree structure generating unit 9113 and document analysis tree structure generating unit 9114 can be used independently, they do not have any successive order in use, nor do they have dependencies between each other. That is, when generating a tree structure representing content of a document for search, one of the above four components that is suitable for the document is selected for use based on actual conditions.

In addition, in other embodiments, it is also possible that these four components of generating tree structure are not included simultaneously and one of the components may be omitted.

Return to FIG. 9, the apparatus 92 for searching documents is used to, based on document query condition (query keywords) inputted by user, search to obtain the candidate documents that satisfy the query condition in the indexes for search of the system database, and present search result generated based on the candidate documents.

Figure 11:
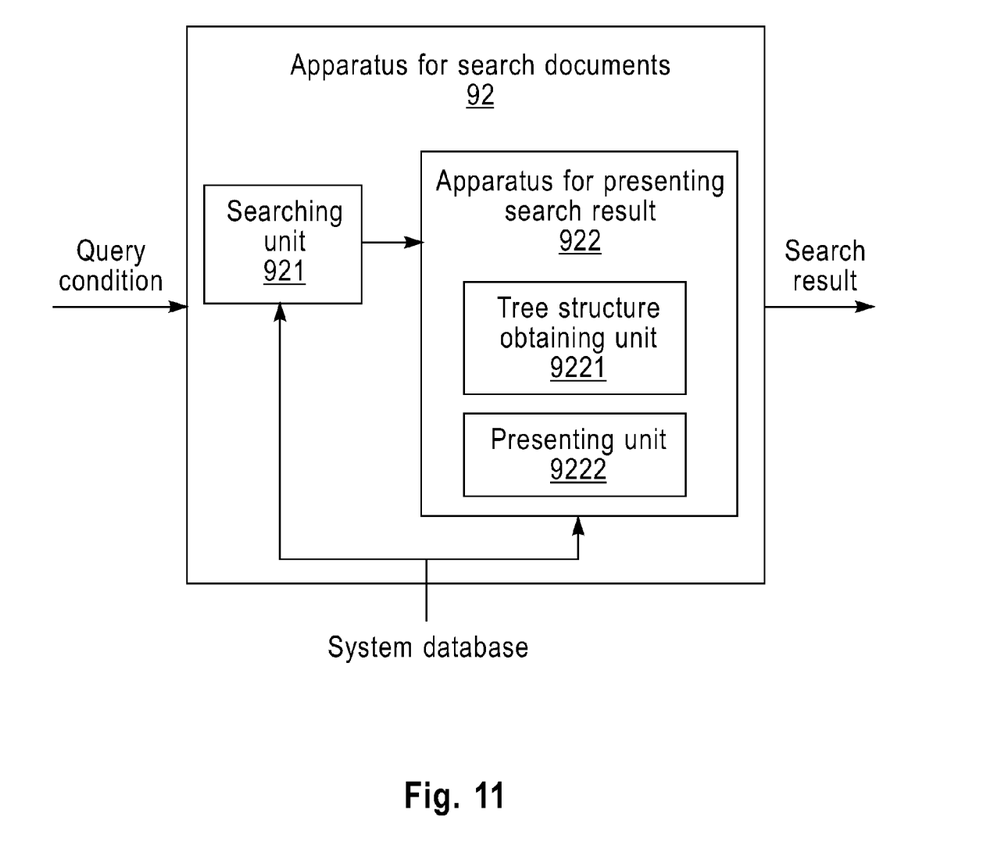
FIG. 11 is a block diagram illustrating an apparatus 92 for searching documents according to an embodiment of the invention.

FIG. 11 is a block diagram illustrating an apparatus 92 for searching documents according to an embodiment of the invention. As shown in FIG. 11, the apparatus 92 for searching documents of the present embodiment comprises a searching unit 921 and an apparatus 922 for presenting search result.

The searching unit 921 is used to, based on query condition inputted by user, search to obtain the candidate documents that satisfy the query condition in indexes for search of the system database 93.

The apparatus 922 for presenting search result is used to present search result generated based on the candidate documents. As shown in FIG. 11, the apparatus 92 for searching documents further comprises: a tree structure obtaining unit 9221 and a presenting unit 9222.

The tree structure obtaining unit 9221 is used to obtain related nodes in corresponding tree structure of respective candidate documents or obtain entireness of the tree structure based on the indexes for search to form at least a portion of the tree structure.

The presenting unit 9222 is used to present the portions obtained from the corresponding tree structures of the candidate documents or entireness of the tree structures as well as corresponding snippets of these candidate documents.

Return to FIG. 9, the system database 93 is used to store the search history, the tree structures respectively representing content of one of the documents for search and the indexes for search, etc.

The foregoing is a description of the system for searching document of the present embodiment. The present invention first generates a tree structure representing content for each of the documents for search at preprocess portion, and generates indexes for search for these documents, each entry of which indicates associated nodes in the tree structures of the documents associated with that entry. Thus, at search portion, documents associated with query keyword and corresponding nodes of their tree structures can be obtained according to the indexes for search, so that snippets of the documents obtained by searching can be presented in the search result.

Therefore, in the present embodiment, since each document is presented by tree-like snippet in search result, which not only contains information related to query keyword of the document, but also contains other key information about the content of the document, more document information can be presented to user within a limited display space, thereby user can obtain an overview of the document without opening or downloading the original document, so that relevance of the document with user's query can be rapidly determined, and browsing speed of the search result can be improved.

The system for searching documents of the present embodiment and its various components can be implemented by hardware circuit such as extremely large scale integrated circuit or gate arrays, semiconductors such as logic chip or transistors, or programmable hardware devices such as field programmable gate array, programmable logic device etc., or can be implemented in form of various type of processors executing corresponding software, or can be implemented by a combination of the above hardware circuit and corresponding software. And these various components can be physically implemented together, or can be physically independent but operationally interoperable to each other.

Although a method and apparatus for preprocessing a plurality of documents for search, a method and apparatus for presenting search result and a method and system for searching documents of the present invention have been described through some exemplary embodiments, these embodiments are not exhaustive, those skilled in the art can realize various changes and modifications within the spirit and scope of the invention. Therefore, the present invention is not limited to these embodiments, the scope of which is only defined by appended claims.

That which is claimed is:

1. A method for preprocessing a plurality of documents for search, comprising:
    for each of said plurality of documents, generating a tree structure representing the content of the document using a computer processor based on a history of previous searches on the document, said tree structure comprises at least one node; and
    generating indexes for search for said plurality of documents, each entry of the indexes indicates therein at least one document associated with the entry and at least one associated node in the tree structure of the document;
    wherein the step of generating a tree structure representing the content of the document based on the history of previous searches on the document comprises:
    recording search history for the document; and
    generating a tree structure representing the content of the document with reference to a word dictionary based on a plurality of keywords in the search history of the document.

2. The method for preprocessing a plurality of documents for search according to claim 1, wherein said tree structure of each of said plurality of documents is a hierarchical tree structure that at least comprises one root node and one leaf node.

3. The method for preprocessing a plurality of documents for search according to claim 2, wherein said tree structure of each of said plurality of documents further comprises at least one intermediate node.

4. The method for preprocessing a plurality of documents for search according to claim 1, wherein each node of the tree structure of each of said plurality of documents contains a keyword set appearing in the document and corresponding to the node.

5. The method for preprocessing a plurality of documents for search according to claim 4, wherein each node of the tree structure of each of said plurality of documents further contains the title of the node and the corresponding location of the node in the document.

6. The method for preprocessing a plurality of documents for search according to claim 1, further comprises periodically updating the tree structure of the document based on the search history of the document.

7. The method for preprocessing a plurality of documents for search according to claim 1, wherein the step of for each of said plurality of documents, generating a tree structure representing the content of the document comprises merging a plurality of paragraphs that are similar in content in the document into one unit to map to one leaf node in the tree structure representing the content of the document.

8. The method for preprocessing a plurality of documents for search according to claim 7, wherein the step of for each of said plurality of documents, generating a tree structure representing the content of the document further comprises further merging a plurality of units that are similar in content among said merged units into one unit to map to one intermediate node in the tree structure representing the content of the document.

9. The method for preprocessing a plurality of documents for search according to claim 8, wherein the step of for each of said plurality of documents, generating a tree structure representing the content of the document further comprises iterating said unit merging step until an overall tree structure representing the content of the document is obtained.

10. The method for preprocessing a plurality of documents for search according to claim 8, wherein the step of further merging a plurality of units that are similar in content among said merged units into one unit further comprises:
    generating a term vector for each of said merged unit;
    calculating similarities of each two of consecutive units in said document based on the term vector of respective said units; and
    merging the consecutive units that the similarities of each two of them reach a defined threshold into one unit.

11. The method for preprocessing a plurality of documents for search according to claim 7, wherein the step of merging a plurality of paragraphs that are similar in content in the document into one unit further comprises:
    generating a term vector for each paragraph in said document;
    calculating similarities of each two of consecutive paragraphs in said document based on the term vector of respective paragraphs in said document; and
    merging the consecutive paragraphs that the similarities of each two of them reach a defined threshold into one unit.

12. The method for preprocessing a plurality of documents for search according to claim 1, wherein said tree structure is represented in the form of a XML file.

13. The method for preprocessing a plurality of documents for search according to claim 1, wherein the tree structure of respective said plurality of documents is stored in association with the document.

14. The method for preprocessing a plurality of documents for search according to claim 1, wherein each entry in the indexes indicates therein an associated node list in the tree structure of the document in that entry.

15. The method for preprocessing a plurality of documents for search according to claim 1, wherein the tree structure being based on a table of content contained in the document, the table of content includes chapter titles and page numbers indicating beginnings of each of the chapter titles.

16. An apparatus for preprocessing a plurality of documents for search, comprising:
a computer processor;
a tree structure generating unit for generating, by the computer processor, for each of said plurality of documents, a tree structure representing the content of the document based on a history of previous searches on the document, said tree structure comprises at least one node; and
an indexes generating unit for generating indexes for search for said plurality of documents, each entry of the indexes indicates therein at least one document associated with the entry and at least one associated node in the tree structure of the document;
a search history tree structure generating unit for generating the tree structure representing the content of the document with a word dictionary based on a plurality of keywords in a search history of the document; and
a search history recording unit for recording the search history of the document.

17. The apparatus for preprocessing a plurality of documents for search according to claim 16, wherein said tree structure generating unit further comprising:
a document analysis tree structure generating unit for generating a corresponding tree structure based on analysis performed on the document.

18. The apparatus for preprocessing a plurality of documents for search according to claim 17, wherein said document analysis tree structure generating unit further comprising:
a term vector generating unit for generating a term vector for each paragraph in said document;
a similarity calculating unit for calculating similarities of each two of consecutive paragraphs in said document based on the term vector of respective paragraphs in said document; and
a merging unit for merging the consecutive paragraphs that the similarities of each two of them reach a defined threshold into one unit;
said document analysis tree structure generating unit maps said merged unit to one leaf node in the tree structure representing the content of the document.

19. The apparatus for preprocessing a plurality of documents for search according to claim 18, wherein
said term vector generating unit further generates a term vector for each said merged unit;
said similarity calculating unit calculates similarities of each two of consecutive units in said document based on the term vector of respective said units;
said merging unit merges the consecutive units that the similarities of each two of them reach a defined threshold into one unit; and
said document analysis tree structure generating unit maps said merged unit to one intermediate node in the tree structure representing the content of the document.

20. The apparatus for preprocessing a plurality of documents for search according to claim 19, wherein said term vector generating unit, said similarity calculating unit and said merging unit iterates said unit merging process until an overall tree structure representing the content of the document is obtained.

21. The apparatus for preprocessing a plurality of documents for search according to claim 16, wherein the tree structure being based on a table of content contained in the document, the table of content includes chapter titles and page numbers indicating beginnings of each of the chapter titles.

* * * * *